UNITED STATES PATENT OFFICE 2,191,576

3,5,6-TRIHYDROXY ANDROSTANE AND PREGNANE COMPOUNDS

Karl Miescher, Riehen, and Werner Fischer, Basel, Switzerland, assignors to the firm Society of Chemical Industry in Basle, Basel, Switzerland No Drawing. Application November 16, 1937, Serial No. 174,906. In Switzerland November 21, 1936

3 Claims. (Cl. 260—397)

This invention is based on the observation that compounds of the androstane and pregnane series, having at least four substituents containing oxygen of which at least three are hydroxyl-groups, exhibit true solubility in water. Such compounds may be produced in many ways. Thus, by means of known methods, there may be attached at the carbon double linking of suitable mono- or poly-unsaturated compounds of the androstane and pregnane series, which if desired may also contain free or substituted, for instance esterified or etherified, hydroxyl- and/or keto-groups, a pair of hydroxyl-groups and if desired any ester or ether groups which may be present may be saponified. The hydroxyl-groups may be attached for instance by the action of hydrogen peroxide if desired in the presence of a catalyst such as an acid, a salt or osmium tetroxide or of osmium oxide alone or in the presence of an oxidizing agent or even with the aid of permanganate. It s also possible to start from oxygen, halogen or halogen hydrine addition products of the said unsaturated compounds and for the purpose of opening the oxygen bridge or for exchanging the halogen for a hydroxyl-group to treat the product in known manner, for example with a saponifying agent. Thus the oxide obtained by the reaction of the unsaturated compound with a peroxide such as benzoyl peroxide may be split by water alone or in presence of an acid.

Furthermore, the keto-groups in suitable poly-ketones or hydroxy-ketones of the saturated or unsaturated androstane or pregnane series, having at least four substituents containing oxygen in which hydroxyl-groups present may be free or may contain substituents, may be converted into hydroxyl-groups wholly or in part with the aid of reducing agents, for instance of hydrogen in the presence of a catalyst in an acid, neutral or alkaline medium. Suitable poly-ketones or hydroxy-ketones may be produced by the action of selenium dioxide or chromic acid on corresponding compounds having double carbon linkages and/or keto-groups whereby the newly acquired oxygen enters in $\alpha$-position to the existing double linkage or keto-groups.

The said methods of preparation may obviously be used in conjunction with each other.

Suitable parent materials are, for instance, the dehydro-androsterones, androstene diols, testosterones, androstene diones, pregnenolones, pregnene diols, progesterone, 17-vinyl-androstene-3,17-diol or 17-vinyl-androstane-3,17-diol (produced for example, from the corresponding hydroxyketones with the aid of vinyl bromide in the presence of magnesium), bis-dehydro-compounds of the androstane and pregnane series, 7-hydroxy- or 7-keto-dehydroandrosterone, also oxygen, halogen or halogen hydrine addition products of correspondingly unsaturated compounds or the like as well as esters and if desired enolesters or ethers of these compounds.

Instead of compounds of the androstane and pregnane series there may also be used stereo-isomerides as parent materials.

The new compounds are as such physiologically active or may be converted into therapeutically active compounds.

The following examples illustrate the invention:

Example 1

2 grams of $\Delta^5$-trans-dehydroandrosterone acetate are dissolved in 10 cc. of glacial acetic acid; there are added 2 cc. of hydrogen peroxide of 30 per cent. strength and the whole is heated on the water bath for 2 hours. After this treatment the solution no longer gives a coloration with tetranitromethane. The glacial acetic acid is distilled completely in a vacuum and the oily residue is saponified in the course of 10 hours by means of 50 cc. of a methyl alcoholic solution of 5 per cent. strength of caustic potash. The saponifying mass is diluted with water and extracted a few times by means of boiling chloroform. After the chloroform solution has been dried over sodium sulfate and somewhat evaporated there crystallizes from it the 3,5,6-trihydroxy-androstanone-17 which is soluble in water but sparingly soluble in most organic solvents. It melts at 300° C. while decomposing strongly. From acetone it crystallizes in slender needles.

Instead of $\Delta^5$- one can start from $\Delta^4$-trans-dehydroandrosterone or an ester thereof or from the corresponding cis-compounds.

Example 2

5 grams of trans-dehydroandrosterone in 100 cc. of chloroform are mixed at $-10°$ C. with a chloroform solution of perbenzoic acid (corresponding with 10 per cent. excess of oxygen) and the mixture is allowed to stand for 40 hours at $+5°$ C. The solution is now shaken with dilute sodium carbonate solution to remove any acid constituents which may be present and after washing it with water is dried over sodium sulfate and evaporated. There are obtained 5.4 grams of a crude product which melts at 201–205° C. and gives no coloration with tetranitromethane. From this product one can obtain by means of acetone an oxide which melts at 229–230° C.

and crystallizes in thick columns. The mother liquor contains small quantities of a product of lower melting point, probably an isomeride.

0.5 gram of the oxide thus obtained is heated in a bomb with 20 cc. of water for 10 hours at 110–115° C. In this reaction a small portion dissolves and the rest may be filtered, being in the form of beautiful crystals. Like the product obtained by extracting the water with boiling chloroform these crystals can be recrystallized from acetone. The 3,5,6-trihydroxy-androstanone-(17) has the same properties as those of the compound obtained as described in Example 1.

*Example 3*

2 grams of $\Delta^5$-androstene-3,17-diol diacetate are dissolved in 10 cc. of glacial acetic acid and the solution is mixed with 1.8 cc. of hydrogen peroxide of 30 per cent. strength and the whole is heated for 2 hours on the water-bath. After distilling the glacial acetic acid in a vacuum the product is saponified by means of 50 cc. of a methyl alcohol solution of 5 per cent strength of caustic potash. After the solution has been evaporated to a small bulk a little water is added and the 3,5,6,17-tetroxy-androstane which has been formed is extracted by means of chloroform. It may be recrystallized from acetone or ethyl acetate.

The same compound is obtained by starting from androstene diol and its mono-esters.

In similar manner there is obtained for example 3,5,6-trihydroxy-pregnane-ole-(20), 3,5,6-trihyroxy-pregnane-one-(20), 3,5,6,7-tetrahydroxy-androstane-17-ole as well as-17-one and the like.

What we claim is:

1. The water-soluble 3,5,6-trihydroxy-androstane and pregnane compounds having at least one further substituent which is a member of the group consisting of

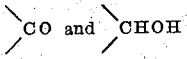

2. The water-soluble 3,5,6-trihydroxy-androstane compounds having in the 17-position a member of the group comprising

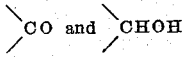

3. The water-soluble 3,5,6-trihydroxy-pregnane compounds having in the 20-position a member of the group comprising

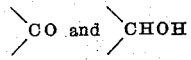

KARL MIESCHER.
WERNER FISCHER.